No. 785,036. PATENTED MAR. 14, 1905.
E. S. FARWELL.
BEARING.
APPLICATION FILED FEB. 11, 1904.
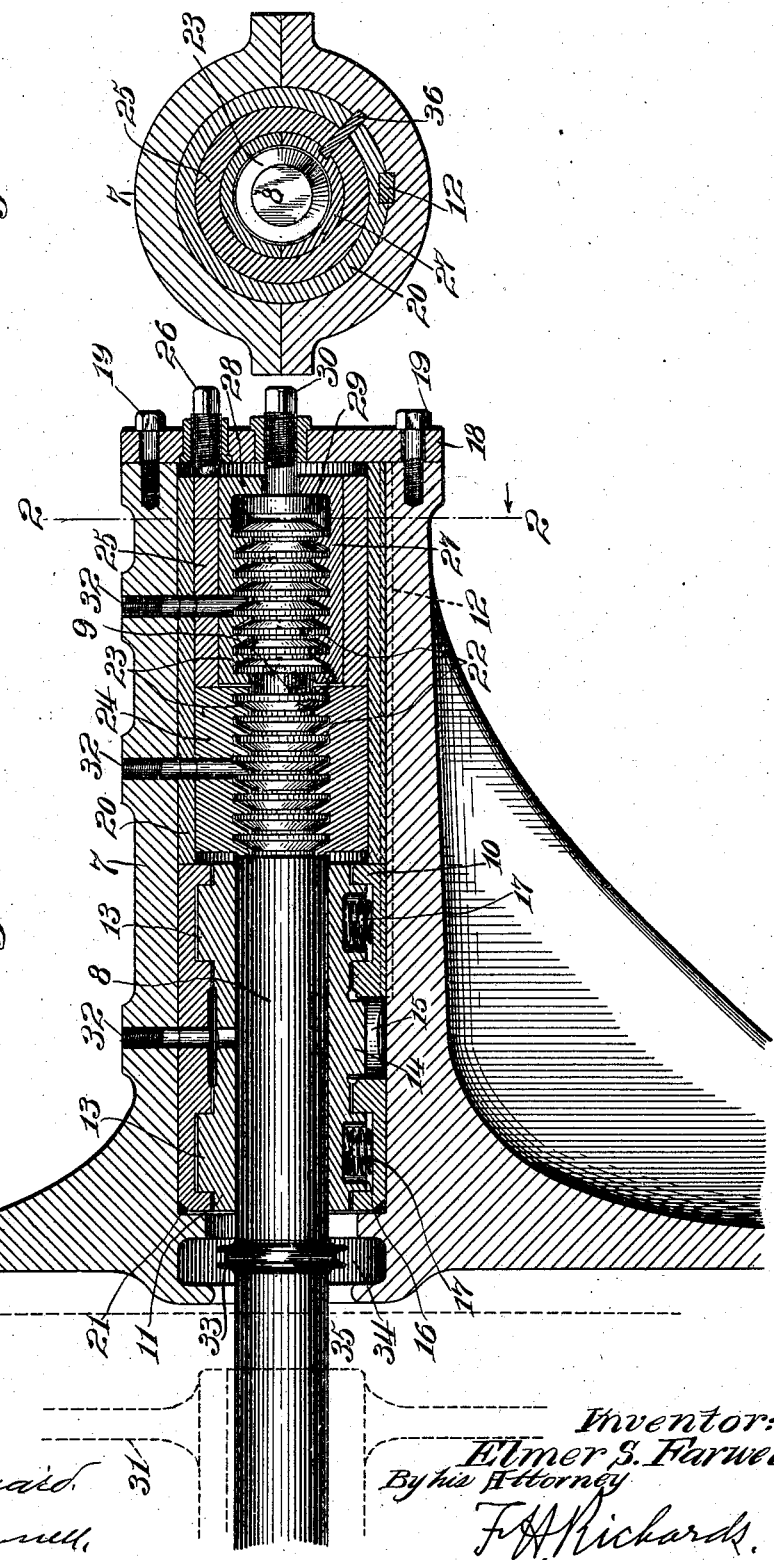

No. 785,036. Patented March 14, 1905.

UNITED STATES PATENT OFFICE.

ELMER S. FARWELL, OF RIDGEWOOD, NEW JERSEY, ASSIGNOR TO EDWIN H. LUDEMAN, OF BROOKLYN, NEW YORK.

BEARING.

SPECIFICATION forming part of Letters Patent No. 785,036, dated March 14, 1905.

Original application filed December 22, 1903, Serial No. 186,191. Divided and this application filed February 11, 1904. Serial No. 193,058.

*To all whom it may concern:*

Be it known that I, ELMER S. FARWELL, a citizen of the United States, residing in Ridgewood, in the county of Bergen and State of New Jersey, have invented certain new and useful Improvements in Bearings, of which the following is a specification.

This invention relates to and has for an object to provide an improved bearing embodying the features of a thrust and a floating bearing and is a division of application for a patent for turbine-engines, filed December 22, 1903, Serial No. 186,191, series of 1900, by me.

In the drawings accompanying and forming a part of the specification, Figure 1 is a central longitudinal section of a bearing-casing and bearing and shows a side view of a shaft therein, and Fig. 2 is a cross-section on the line 2 2 of Fig. 1 looking in the direction of the arrow.

In many employments, particularly turbine-engines, it is found desirable to employ a thrust-bearing and a floating bearing. The illustration herein shows a bearing-casing 7 in longitudinal section, and the shaft within such casing is shown with a plain bearing portion 8 and a portion 9, provided with rings. The plain or bearing portion may be supported by a suitable bearing member—in the present instance supported by floating bushings—and the ring portion may be incased in thrust-bushings. The bearing-casing is shown as having within it a split bushing 10, conforming to the casing and held from rotation therein by means of a spline, (shown in dotted lines by 12.) Within such bushing is a floating bushing 11, having a working fit with the shaft, but having a loose fit with the surrounding bushing, permitting an oil-cushion between them. The floating bushing in the form herein shown is provided with rings 13, fitting in corresponding recesses in said bushing 10. Said rings 13 have a working fit in said recesses on their longitudinal faces, but have a clearance on their cylindrical surfaces to allow the same amount of transverse movement as does the loose fit between the main portions of said bushings 10 and 11. In this way the space between said bushings 10 and 11 is divided into three separate oil-cushion compartments, which allow a limited transverse movement of the floating bushing, but prevent its longitudinal movement and retain the oil in said separate compartments. The bushing 11 is also provided with a boss 14, entering a chamber or seat 15 in the bushing 10 to prevent rotation of such floating bushing. To support the dead-weight of the turbine when the engine is not running or is not running rapidly, suitable chambers 16 may be provided and supplied with elastic cushions, (shown as springs 17.) After the engine becomes free in its running the turbine will float in its bearings, as is well known. The end of the bearing-casing is closed by a suitable cap 18, removably held in place by tap-bolts 19, and has within it a bushing 20, abutting at one portion the cap and resting against the split bushing 10, whereby the cap will hold the same in place. A suitable soft packing 21 may be provided at the inner end of the casing, so as to prevent air leaking into the chamber.

It will be noticed that one portion of the rings upon the shaft have radially-projecting faces 22 and faces 23 sloping toward one end and that the other portion has its radial faces projecting in the opposite direction, as are also the sloping faces, this affording bearings against thrust in different directions. One section of the thrust-bearing portion of the shaft is illustrated seated in a split bushing 24, held in place by means of a bushing 25, adjusted by a set-screw 26. The other section may be surrounded by a split bushing 27, having its end reduced to form a shoulder 28 to receive a head 29 of a set-screw 30. By means of the set-screws 26 and 30 the several bushings or sections constituting the thrust-bearing may be shifted longitudinally in the same direction or may be shifted in opposite directions, so as to adjust the position of the member carried thereby (in the present instance the dotted lines 31 represent a broken-away portion of a wheel) and also to adjust its limit of movement or to prevent it having any movement in an axial direction.

A number of oil-holes 32 are shown, and oil will be freely supplied to the bearing. The shaft may be surrounded with a number of oil-rings 33, running within a chamber 34, so that the centrifugal force will throw the oil into the chamber, which chamber is in communication with the chamber 35, which is connected with the exhaust, so that oil will be drawn into the bearing, the oil of course maintaining the bearings tight, so that they will not leak to disturb the vacuum; but the vacuum will have a tendency of keeping the parts well oiled by a continuous flow of oil and afford lubrication and oil-cushions, and the oil-rings will prevent the oil running along the shaft and getting into the parts of the device where it is not desired.

Fig. 2 is taken on about the position of the outermost oil-hole and shows the various bushings held in their place by means of a key 36. It will be noted that the key 12 not only holds the bushing 10 in place, but also the bushing 20.

It will be noticed that the thrust portions of the bearing act in the present instance as thrust-bearings only that engage the shaft about radial planes transverse to the axis of the shaft and do not support the perimeter. Spaces are shown at the perimeters of the various rings upon the shaft substantially equal to the amount of play of the floating bearing, so that when the wheel or other device attached to the shaft becomes free in its running the thrust-bearings will not impede freedom of floating.

Although springs are shown to support the floating bushing when the engine is idle or running at a low rate of speed, yet such springs may be dispensed with, other yieldable means may be employed, or the bearing may be permitted to rest upon the casing at such times as the shaft is not running free.

Having thus described my invention, I claim—

1. The combination with a casing embodying a bearing-casing, of a shaft mounted in such bearing-casing, said shaft comprising a journal portion and a portion having peripheral channels; a floating bushing within the bearing-casing for the journal and a pair of ribbed bushings for the channeled portion and means to independently adjust said ribbed bushings on the axial line of the shaft.

2. The combination with a shaft having a plain journal and a ribbed portion; of a bearing-casing; a floating bushing therein for the journal and a thrust-bearing embodying a pair of split bushings provided with ribs to engage the ribs on the shaft and means to independently longitudinally adjust the thrust-bushings.

3. A bearing for high-speed apparatus comprising a floating bushing, a thrust-bearing contiguous to the same and embodying a sectional split bushing having ribs to take into thrust-ribs on a shaft, and means to adjust the sections in opposite axial directions.

4. The combination with a casing embodying a bearing-casing, of a shaft mounted in such bearing-casing, and a portion of said shaft having peripheral channels; a pair of ribbed bushings for said channeled portion; and means to independently adjust said ribbed bushings on the axial line of the shaft.

5. The combination with a casing embodying a bearing-casing, of a shaft mounted in such bearing-casing, and a portion of said shaft having peripheral channels; a pair of bushings for said channeled portion, each bushing extending entirely around the shaft, and independent means to adjust said bushings to limit the longitudinal movement of the shaft in each direction.

6. A bearing for high-speed motors comprising a floating bushing, means to support the same while at dead-load, a thrust-bearing beyond the same and embodying a sectional bushing having ribs taking into thrust-ribs on a shaft and means to adjust the sections in opposite directions axially.

7. A bearing for high-speed motors comprising a floating bushing, yieldable means to support the same while at dead-load, a thrust-bearing beyond the same and embodying a sectional bushing having ribs to take into thrust-ribs on a shaft and means to adjust the sections in opposite directions axially.

8. A thrust-bearing for a high-speed motor embodying a sectional split bushing having ribs to take into thrust-ribs on the shaft; a plain bushing surrounding one of the ribbed bushings and adapted to hold the other ribbed bushings from longitudinal movement, means of adjusting the position of said plain bushing, and independent means for adjusting and holding the first-mentioned ribbed bushing from longitudinal movement.

9. In combination with a shaft for a high-speed motor embodying a plain bearing portion and a thrust-bearing portion surrounded by a number of rings; a bearing-casing; a floating bushing therein for such plain bearing portion of the shaft; thrust-bearing bushings therein having ribs to engage the rings of the shaft, and divided transversely into sections, and means to independently adjust the sections.

10. A high-speed bearing comprising a shaft having a bearing portion and a thrust-bearing portion, a floating bearing engaging the bearing portion, thrust-bearings engaging the thrust portion upon faces transverse to the axis of the shaft.

11. In a bearing the combination with a shaft having a plain portion and having faces transverse to its axis, some of such faces directed in one direction and some in the other, a floating bearing for the plain portion of the shaft, and means to engage the respective faces of the thrust-bearing and having free spaces about the perimeter thereof.

12. A bearing for high-speed apparatus comprising a casing, a shaft mounted therein, a floating bushing within said casing having rings fitting corresponding recesses, and means to support the same while at dead-load.

13. A bearing for high-speed apparatus comprising a casing, a shaft mounted therein, a bushing fitting said casing and secured from turning therein, a floating bushing having rings fitting corresponding recesses in said stationary bushing, and yieldable means to support the same while at dead-load.

14. A bearing for high-speed apparatus comprising a casing, a shaft mounted therein, a bushing fitting said casing and secured from turning therein, a floating bushing having rings fitting corresponding recesses in said stationary bushing, means for admitting liquid to the space between said bushings and springs to support said floating bushing in a central position.

Signed at Nos. 9 to 15 Murray street, New York, N. Y., this 8th day of February, 1904.

ELMER S. FARWELL.

Witnesses:
CHAS. LYON RUSSELL,
FRED. J. DOLE.